J. BEREZNAY.
SELF PROPELLED SLEIGH.
APPLICATION FILED FEB. 28, 1920.
1,345,062.
Patented June 29, 1920.
2 SHEETS—SHEET 1.
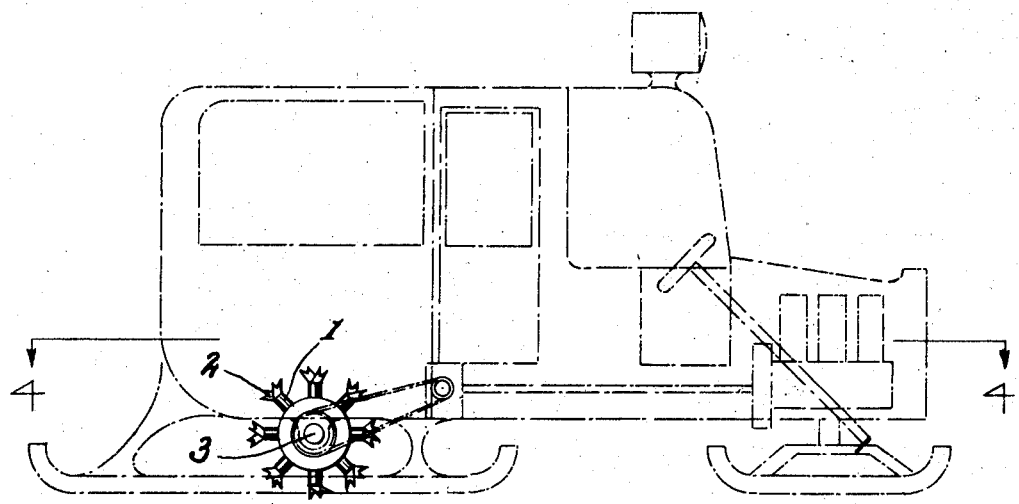
FIG_1
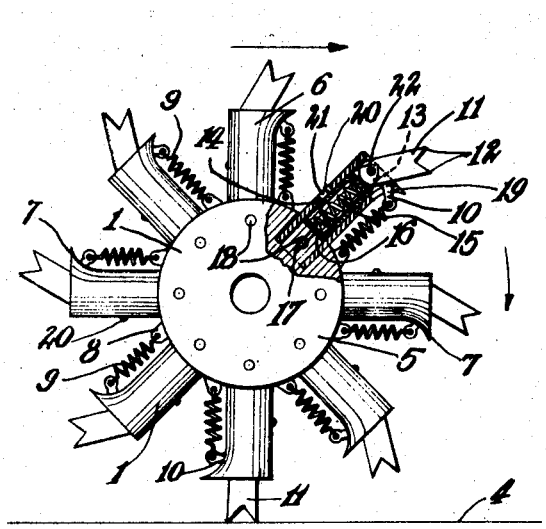
FIG_2
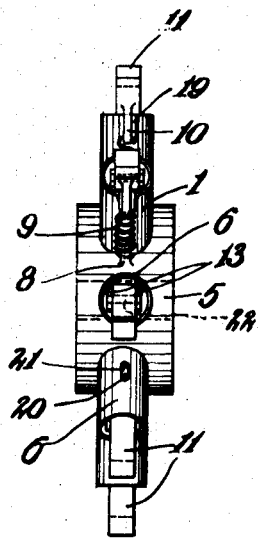
FIG_3
INVENTOR
John Bereznay
BY
Harry Jacobson
ATTORNEY J. BEREZNAY.
SELF PROPELLED SLEIGH.
APPLICATION FILED FEB. 28, 1920.
1,345,062.
Patented June 29, 1920.
2 SHEETS—SHEET 2.
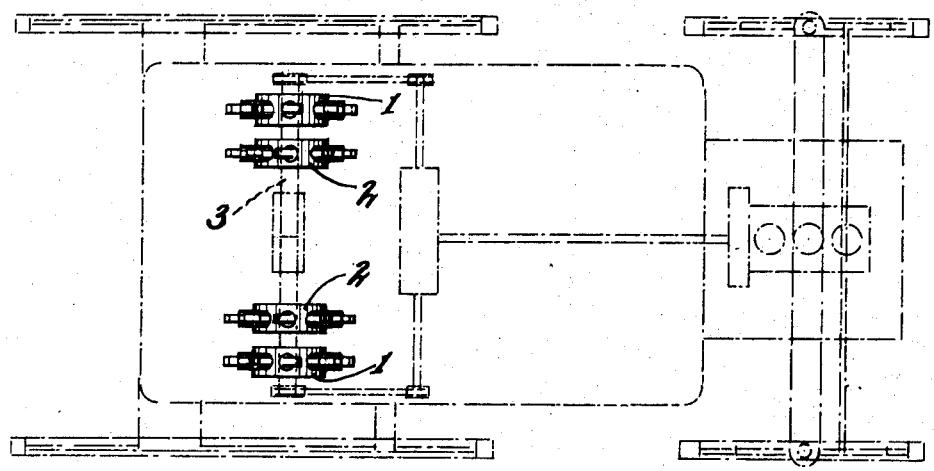
FIG_4
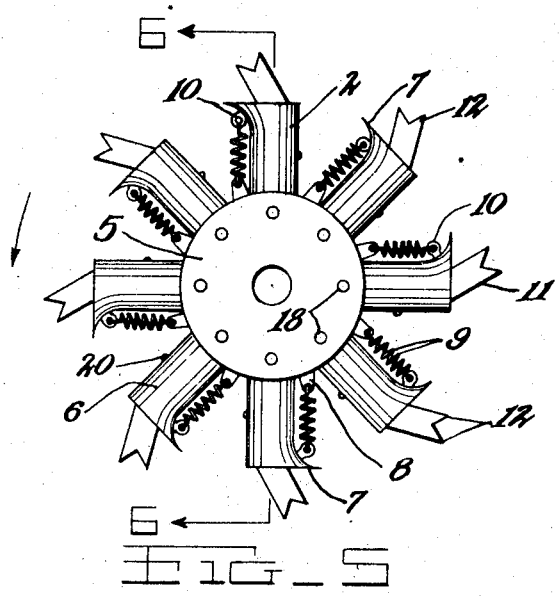
FIG_5
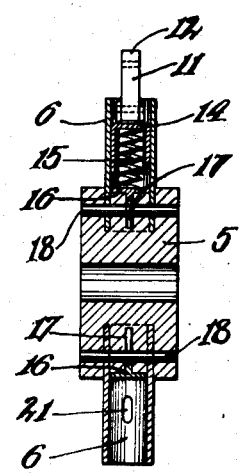
FIG_6
INVENTOR
John Bereznay
BY
Harry Jacobson
ATTORNEY

UNITED STATES PATENT OFFICE.

JOHN BEREZNAY, OF THROOP, PENNSYLVANIA.

SELF-PROPELLED SLEIGH.

1,345,062.         Specification of Letters Patent.      Patented June 29, 1920.

Application filed February 28, 1920. Serial No. 361,966.

*To all whom it may concern:*

Be it known that I, JOHN BEREZNAY, citizen of the United States, and resident of Throop, in the county of Lackawanna and State of Pennsylvania, have invented certain new and useful Improvements in Self-Propelled Sleighs, of which the following is a specification.

This invention relates to self propelling sleighs and especially to the means employed for engaging the surface on which the vehicle rests for propelling the vehicle.

The object of this invention is the provision of revoluble means, positive in operation and smooth in action, for firmly gripping a slippery surface such as ice or hard snow on which the vehicle may rest, and for acting as a fulcrum about which the vehicle may be moved.

For the attainment of the aforesaid and other objects, I employ the arrangement and combination of parts shown in the accompanying drawings, in which, Figure 1 is a side elevation of my invention as it appears attached to a motor sleigh. Fig. 2 is a side elevation and partial section of one of the propelling wheels designed to act when it rotates in a direction suitable for forwarding the vehicle. Fig. 3 is a front elevation of the same. Fig. 4 is a plan view and horizontal section on line 4—4 of Fig. 1. Fig. 5, is a side elevation of a propelling wheel designed to act when it rotates in a direction suitable for giving the vehicle backward motion. Fig. 6 is a vertical section on line 6—6 of Fig. 5.

In the practical embodiment of my invention, two sets of driving wheels 1 and 2 are mounted on a shaft 3 driven in any suitable manner, not necessary to be here described, from the vehicle motor, the weight of said vehicle being sustained on sleigh runners of the usual type.

Shaft 3 is normally rotated in the proper direction to drive the vehicle forward, in which case wheels 1 operate to grip the surface 4 to propel the vehicle. When it is desired to reverse the motion, shaft 3 is rotated in the opposite direction by the usual mechanism, provided for that purpose, whereby wheels 2 are automatically put into action. A description of one of the driving wheels will suffice for all, it being remembered that one set, as wheels 1, is designed to operate when the driving shaft is rotated in one direction, and the other set as 2, is designed to operate when said shaft is rotated in the opposite direction.

Each of said wheels has a central hub 5, which has radially mounted thereon, a series of open hollow cylinders 6 each flared at the outer end thereof at 7. Lugs 8 project radially from the cylindrical surface of hub 5 and are adapted to securely hold one end of spring 9, the other end of which is attached to ear 10 of gripper 11. Said gripper is notched at its outer end to provide sharp edges as 12, for firmly engaging surface 4, as will be more fully described hereinafter, the other end of said gripper being pivotally attached between flanges 13 of the hollow plunger 14 by pin 22, said plunger being open at the inner end thereof. The gripper is normally held by spring 9 in such a position that its longitudinal axis is inclined to the axis of cylinder 6 in the direction of the rotation of the wheel, said gripper projecting from said cylinder a sufficient distance to allow edges 12 to cut into surface 4 on the rotation of said wheel in the proper direction.

For resisting any inward radial movement of said plunger within said cylinder 6, a spring 15 is arranged inside of plunger 14, the inner end of said spring resting against disk 16, which is suitably fastened to hub 5, as by pin projection 17 and rivet 18, said rivet also acting to hold cylinder 6 to said hub. An opening 19 is made in flared end 7 of cylinder 6 to allow ear 10 to project therethrough. A pin 20 is secured in plunger 14 and moves in slot 21 of cylinder 6 on the movement of said plunger to prevent displacement of said plunger about its axis.

The operation of my improved wheel is as follows:

Power being applied to shaft 3 in the proper direction to forward the vehicle, both sets of wheels 1 and 2, are rotated. The grippers 11 of set 2, on rotation in the direction of the arrow of Fig. 2, will, on striking surface 4, be swung about pivot pin 22 until ear 10 strikes the bottom of slot 19, in which position said grippers are dragged over surface 4 until lifted therefrom, by the continued rotation of said wheel. It will be obvious that sharp edges 12 of the grippers cannot cut into surface 4, since no resistance is offered to the rotation of said gripper about pivot 22 whereby there can be no appreciable pressure of sharp edges 12 on said surface.

On the other hand, rotation of wheel 1 in the direction of the arrow in Fig. 2, will cause said edges 12 of gripper 11 to be firmly pressed into the surface 4 by the tendency of said gripper to rotate about pivot 22 against the action of spring 9. When the gripper is swung about pivot 22, the distance of edges 12 from the center of wheel 1 increases, and the point of contact of said edges with the surface 4 becomes a fulcrum about which the force rotating shaft 3 forces the vehicle forward. Continued rotation of shaft 3 after the first contact is made between gripper 11 and surface 4 straightens out said gripper so that the axis thereof and the axis of cylinder 6 be practically in a straight line.

Spring 15 has sufficient resistant properties to ordinarily prevent gripper 11 from forcing plunger 14 inwardly, but is designed to take up any unevenness in the surface 4 by which extraordinary pressure is put on said plunger. In the event of the gripper striking a bump in the ground, the radial distance of edges 12 from shaft 3 is decreased, plunger 14 moving inwardly and the shock being taken up by spring 15. Forward motion of the vehicle continues so long as edges 12 remain in contact with surface 4.

The number of cylinders 6 and grippers 11 is such that as one of said grippers leaves the surface 4, another one comes into contact therewith so that continuous, smooth and positive motion is assured.

What I claim is:

1. In a self propelled sleigh, a wheel comprising a hub, a hollow cylinder flared at its outer end on one side, mounted radially in said hub, a hollow cylindrical plunger open at its inner end and closed at its outer end mounted for radial reciprocation in said cylinder, flanges at the outer end of said plunger, a spring inside said plunger for urging said plunger to its outermost position, a gripper having two gripping edges pivoted between the flanges of said plungers, an ear on said gripper, a lug on said hub, and a spring attached to said lug and said ear for normally pressing said gripper against the flared surface of said cylinder for holding said gripper inclined to the radius of said wheel in the direction of rotation of said wheel.

2. In a self propelled sleigh, a spoke and gripping element for a rimless wheel comprising a hollow cylinder flared at its outer end at one side thereof, mounted radially in said wheel, a hollow cylindrical plunger mounted yieldingly for reciprocation in said cylinder, flanges at the outer end of said plunger, a flat gripper having a notch at the outer end thereof to form two gripping edges pivoted between said flanges, and means for normally holding said gripper in a position in which the center line thereof is inclined to the center line of said cylinder in the direction of rotation of said wheel.

Signed at Throop in the county of Lackawanna and State of Pennsylvania this 25 day of February A. D. 1920.

JOHN BEREZNAY.